United States Patent
Elmendorf et al.

(10) Patent No.: US 9,922,149 B2
(45) Date of Patent: *Mar. 20, 2018

(54) INTEGRATION OF FUNCTIONAL ANALYSIS AND COMMON PATH PESSIMISM REMOVAL IN STATIC TIMING ANALYSIS

(71) Applicant: International Business Machines Corporation, Armonk, NY (US)

(72) Inventors: Peter C. Elmendorf, Poughkeepsie, NY (US); Kerim Kalafala, Rhinebeck, NY (US); Stephen G. Shuma, Underhill, VT (US); Alexander J. Suess, Hopewell Junction, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 18 days.

This patent is subject to a terminal disclaimer.

(21) Appl. No.: 15/132,554

(22) Filed: Apr. 19, 2016

(65) Prior Publication Data

US 2017/0147739 A1  May 25, 2017

Related U.S. Application Data

(63) Continuation of application No. 14/945,928, filed on Nov. 19, 2015, now Pat. No. 9,418,201.

(51) Int. Cl.
*G06F 17/50* (2006.01)

(52) U.S. Cl.
CPC ...... *G06F 17/5031* (2013.01); *G06F 17/5045* (2013.01); *G06F 2217/78* (2013.01); *G06F 2217/84* (2013.01)

(58) Field of Classification Search
CPC ............ G06F 17/5031; G06F 17/5022; G06F 17/4031; G06F 17/5045
USPC .................................................. 716/106–108
See application file for complete search history.

(56) References Cited

U.S. PATENT DOCUMENTS

| | | | | |
|---|---|---|---|---|
| 5,636,372 A * | 6/1997 | Hathaway | ........ | G01R 31/31727 713/500 |
| 7,089,143 B2 * | 8/2006 | Foreman | ............ | G01R 31/3016 702/125 |
| 7,117,466 B2 * | 10/2006 | Kalafala | ............. | G06F 17/5031 716/108 |

(Continued)

OTHER PUBLICATIONS

List of IBM Patents or Patent Applications Treated as Related; (Appendix P), Filed Apr. 19, 2016; 2 pages.

(Continued)

Primary Examiner — Stacy Whitmore
(74) Attorney, Agent, or Firm — Cantor Colburn LLP

(57) ABSTRACT

A method, system, and computer program product to integrate functional analysis and common path pessimism removal (CPPR) in static timing analysis include determining initial path slack for a path for a given timing analysis test. The method also includes comparing the initial path slack with a threshold value to determine if the path passes or fails the given timing analysis test, and based on the path failing the given timing analysis test, performing the functional analysis on the path only based on performing the CPPR on the path, or performing the CPPR on the path only based on a result of performing the functional analysis on the path.

17 Claims, 6 Drawing Sheets

(56) References Cited

U.S. PATENT DOCUMENTS

| | | | | |
|---|---|---|---|---|
| 7,191,419 B2* | 3/2007 | Soreff | ............... | G06F 17/5031 716/113 |
| 7,356,793 B2* | 4/2008 | Curtin | ............... | G06F 17/5031 703/16 |
| 7,487,487 B1* | 2/2009 | Polson | ............... | G06F 17/5031 716/113 |
| 7,823,098 B1* | 10/2010 | Moon | ............... | G06F 17/5031 716/100 |
| 7,823,108 B2* | 10/2010 | Curtin | ............... | G06F 17/5031 703/14 |
| 8,271,923 B2* | 9/2012 | Darsow | ............... | G06F 17/5031 703/16 |
| 8,572,532 B1* | 10/2013 | Singh | ............... | G06F 17/505 716/107 |
| 8,788,995 B1* | 7/2014 | Kumar | ............... | G06F 17/5031 716/110 |
| 8,863,052 B1* | 10/2014 | Dhuria | ............... | G06F 17/5036 716/108 |
| 2005/0066297 A1* | 3/2005 | Kalafala | ............... | G06F 17/5031 716/108 |
| 2008/0209372 A1* | 8/2008 | Buck | ............... | G06F 17/5031 716/113 |
| 2012/0159414 A1* | 6/2012 | Ghanta | ............... | G06F 17/5031 716/113 |
| 2012/0278778 A1* | 11/2012 | Bhardwaj | ............... | G06F 17/50 716/113 |

OTHER PUBLICATIONS

Peter C. Elmendorf et al., "Integration of Functional Analysis and Common Path Pessimism Removal in Static Timing Analysis", U.S. Appl. No. 14/945,928, filed Nov. 19, 2015.

* cited by examiner

INTEGRATION OF FUNCTIONAL ANALYSIS AND COMMON PATH PESSIMISM REMOVAL IN STATIC TIMING ANALYSIS

CROSS-REFERENCE TO RELATED APPLICATION

This application is a continuation of U.S. application Ser. No. 14/945,928 filed Nov. 19, 2015, the disclosure of which is incorporated by reference herein in its entirety.

BACKGROUND

The present invention relates to static timing analysis of an integrated circuit design, and more specifically, to integration of functional analysis and common path pessimism removal in static timing analysis.

Timing analysis is performed during the various stages of digital integrated circuit design to ensure that timing requirements are met in every portion of the resulting integrated circuit or chip. Many known tests (e.g., setup test, hold test) may be performed as part of the timing analysis. The tests examine the worst-case scenario in most cases. Thus, for example, the setup test determines if the late mode arrival time at the input of a data node of a device is still earlier than the early mode arrival time at the clock node so that the data is captured correctly. Common path pessimism (CPP) is a source of pessimism or unnecessary timing penalty in timing analysis tests. CPP refers to the difference between the minimum and maximum delay (early mode and late mode) when two delays that are compared have a path in common. Early mode and late mode arrival times and delays result from variations in chip and environmental conditions. When the delay through a common path is computed assuming early mode in one case (e.g., for arrival time at the data node) and late mode in the other case (e.g., for arrival time at the clock node), the resulting test outcome is unnecessarily pessimistic, because two different chip or environmental conditions are assumed for the same path. In the case of a setup test, for example, if an edge (path) from the source node to the data node is the same as an edge from the source node to the clock node, then the early mode delay through that edge is considered for purposes of determining early mode arrival time at the clock node but the late mode delay through that same edge is considered for purposes of determining late mode arrival time at the data node. That is, different delays are assumed (with respect to each destination) for the same edge. Common path pessimism removal (CPPR) is a technique for adjusting timing slack (crediting some time back to the edge) to account for the CPP associated with the edge.

SUMMARY

Embodiments include a method, system, and computer program product to integrate functional analysis and common path pessimism removal (CPPR) in static timing analysis. Aspects include determining, using a processor, initial path slack for a path for a given timing analysis test; comparing, using the processor, the initial path slack with a threshold value to determine if the path passes or fails the given timing analysis test; and based on the path failing the given timing analysis test, performing the functional analysis on the path only based on performing the CPPR on the path, or performing the CPPR on the path only based on a result of performing the functional analysis on the path.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

The verification of timing and functionality of a chip design involves a number of different types of tests. As noted above, timing analysis tests may consider both early mode and late mode delay through the same edge, thereby giving rise to CPP. CPPR is a technique used to adjust timing slack (and, thus, the timing test result) to account for the CPP. Specifically, some positive timing slack is given to the path to account for the pessimism relating to assuming both an early mode and a late mode for the same path. Depending on the type of test being conducted, CPPR may be performed on a path-by-path basis. One example of such a test is a hold test. A hold test is a type of functional analysis that examines a race condition between an early mode data arrival time and a late mode clock arrival time at a flip-flop (latch). A negative slack indicates that the data may not remain stable for capture. However, if the hold test indicates a negative slack that is due to a non-inverting feedback path (i.e., a non-inverter in the path from a latch output back to the latch input), then a "don't care" condition is created whereby the negative slack may be ignored. This is because the non-inverting path does not change the data value of the flip-flop in any case. As a result, while CPPR is performed on a path-by-path basis, some of the paths in a hold test (non-inverting feedback paths) do not require the slack adjustment due to CPP. Prior techniques separately performed the functional analysis and CPPR and identified these paths with timing tags. However, the process of adding the timing tags uses overhead resources just as the process of performing CPPR uses resources. Embodiments of the systems and methods detailed herein relate to integrating the CPPR process with results of functional analysis to eliminate unnecessary CPPR implementation or unnecessary functional analysis. While hold control is discussed as a specific example of a type of functional analysis that lends itself to the filtering based on path-by-path CPPR implementation, the hold control test is only used for explanatory purposes. The embodiments detailed herein relate to any form of functional analysis that can be performed on a path-by-path basis.

Figure 1:
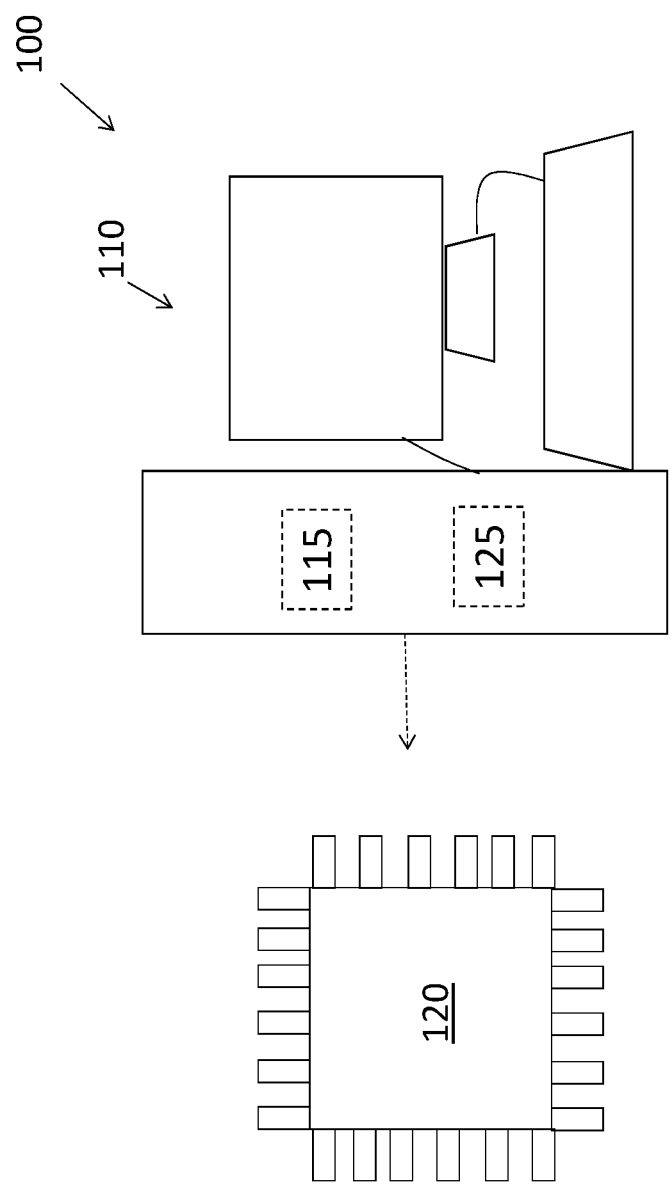
FIG. 1 is a block diagram of a system according to embodiments.

FIG. 1 is a block diagram of a system 100 according to embodiments of the invention. The system 100 includes a processing system 110 used to design an integrated circuit and the resulting physical implementation of the integrated circuit 120. The system 100 includes additional known components that perform functions such as, for example, obtaining measurements from the integrated circuit 120 that are provided to the processing system 110 as needed. The processing system 110 includes one or more memory devices 115 and one or more processors 125. The memory device 115 stores instructions implemented by the processor 125. As further discussed below, these instructions include processes used to perform filtered CPPR or integrated functional analysis and CPPR. According to the embodiments detailed below, the memory device 115 may additionally store the functional analysis results.

Figure 2:
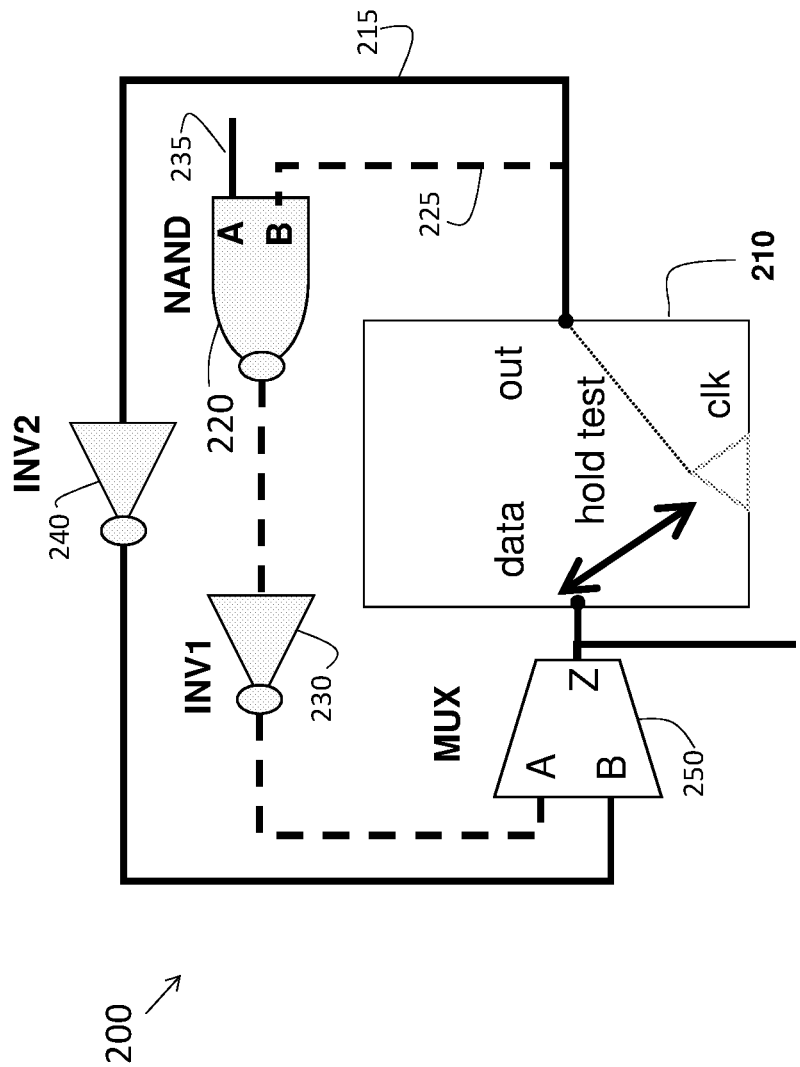
FIG. 2 depicts an exemplary circuit to which embodiments discussed herein are applied.

FIG. 2 depicts an exemplary circuit 200 to which embodiments discussed herein are applied. FIG. 2 shows a flip-flop 210 with two feedback paths, an inverting path 215 and a non-inverting path 225. The inverting path 215 includes inverter 240, and the non-inverting path 225 includes a NAND gate 220 followed by an inverter 230. A third path 235 provides one of the inputs A to the NAND gate 220. While the input at path 235 and the inverting path 215 could inject a new value in the flip-flop 210, the non-inverting path 225 will not inject a new value in the flip-flop 210 if this signal reaches the multiplexer (mux) 250 first. This is the reason that the non-inverting path 225 generates a "don't care" condition. Whether this data remains stable long enough to capture the data or not (i.e., whether the hold condition is satisfied or not) is irrelevant because the value is unchanged from the existing data value in the flip-flop 210. As a result, even if there is negative slack in this path 225 (i.e., early mode data arrival time is less than the late mode clock arrival time at the flip-flop 210), CPPR is not needed to adjust the timing slack, because the timing slack is not relevant to the correct operation of the flip-flop 210.

Figure 3:
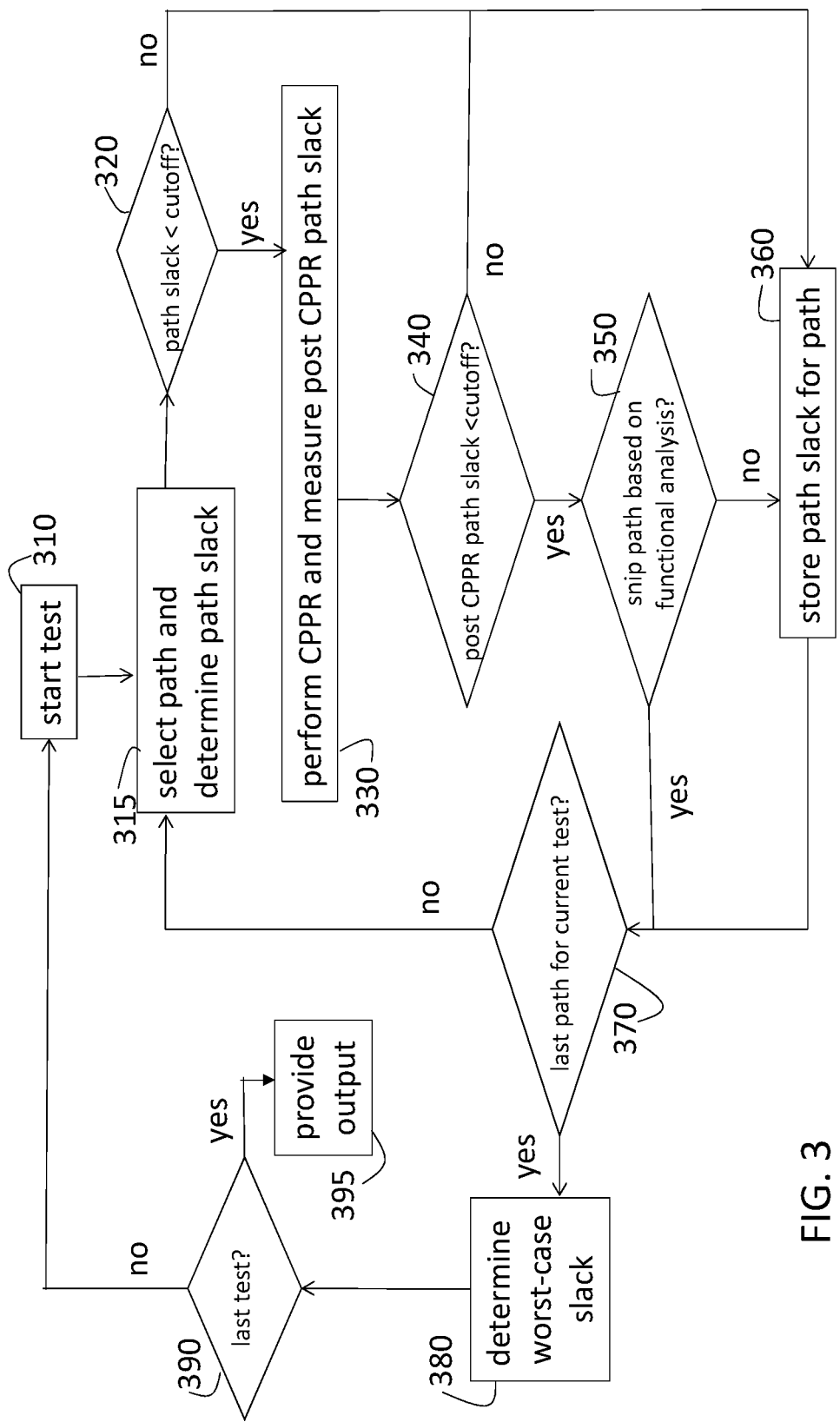
FIG. 3 is a process flow of a method of integrating functional analysis with CPPR according to an embodiment.

FIG. 3 is a process flow of a method of integrating functional analysis with CPPR according to an embodiment. Multiple tests may be analyzed, as indicated by FIG. 3, to account for multiple clocks tested against the same data node, or to account for multiple timing tags arriving at the same clock and/or data nodes, for example. Further, multiple paths may be considered for a given test based on more than one path traversing from a primary input source node to the data node or clock node of the given test. The worst result (lowest slack value) among the paths may be retained so that the timing analysis considers the worst-case scenario. The embodiment detailed with reference to FIG. 3 relates to eliminating unnecessary functional analysis based on CPPR results. At block 310, starting a test leads to selecting a path and determining path slack, at block 315. Determining path slack includes computing the arrival times at the data node and the clock node and comparing them based on the particular test. For example, in a hold test, the late mode arrival time of the clock node and early mode arrival time of the data node are compared. Computing the arrival times is done by a known process of propagating the arrival time at a source node (of the path) forward to the clock node and the data node using delay values through the edges that interconnect nodes along the path. Every arrival time and delay has an early mode value and a late mode value. Depending on the test being performed, only the early mode value or only the late mode value may be needed for a particular segment of the path. This is detailed further with reference to FIG. 5.

At block 320, checking the path slack resulting from the arrival times may include (in the exemplary case of the hold test) subtracting the late mode arrival time at the clock node from the early mode arrival time at the data node. The cutoff value may be user-specified or determined by previous processes and represents a minimum slack to pass the test. When the slack is less than the cutoff (test failed), then performing CPPR and measuring post-CPPR path slack is performed at block 330. This is a known process of adjusting delay through the common paths (the paths that are subject to CPP) or, more specifically, path segments that lead to both the data node and the clock node. The CPPR process is further discussed with reference to FIG. 6 below. The adjusted arrival times (based on the adjusted delays) at the data node and clock node are used to determine post-CPPR path slack, which is the slack computed according to the test for the current path under test.

At block 340, if the post-CPPR path slack is still less than the cutoff (test failed), then functional analysis is performed and a determination is made, at block 350, as to whether the path may be snipped or not (whether the path is a non-inverting feedback path and, thus, a "don't care" path). If the path should be snipped, then the path is not considered for purposes of post-CPPR analysis and the processes proceed to block 370. If the path should not be snipped, then the path slack is stored (both the initial and post-CPPR path slack) at block 360. If the check (at block 320) indicates that initially computed path slack passes (is not less than the cutoff) or if the check (at block 340) indicates that the post-CPPR path slack passes (is not less than the cutoff), then storing the path slack, at block 360, is performed, as well, but without performing functional analysis (block 350). When the initial path slack passes (at block 320), only the initial path slack is stored at block 360, and when the path is not snipped (at block 350), both the initial and post-CPPR path slack is stored at block 360.

As FIG. 3 indicates, the functional analysis (at block 350) may be bypassed if initial or post-CPPR path slack is sufficiently large (is greater than or equal to the cutoff). Once the path slack for the current path is stored with the initial and post-CPPR path slack (at block 360), a determination is made about whether the last path for the current test has been processed (at block 370). If it has not, selecting another path (at block 315) and the processes at blocks 320 through 360 are repeated. If the last path has been reached, then determining worst-case slack for the test, at block 380, includes determining a difference between the minimum post-CPPR slack (determined at block 320 for each path) and the minimum pre-CPPR slack (determined at block 315 for each path). At block 390, it is determined if the last test has been completed. If not, the processes discussed above are repeated for the next test, and if the last test has been completed, the output is provided, at block 395.

Figure 4:
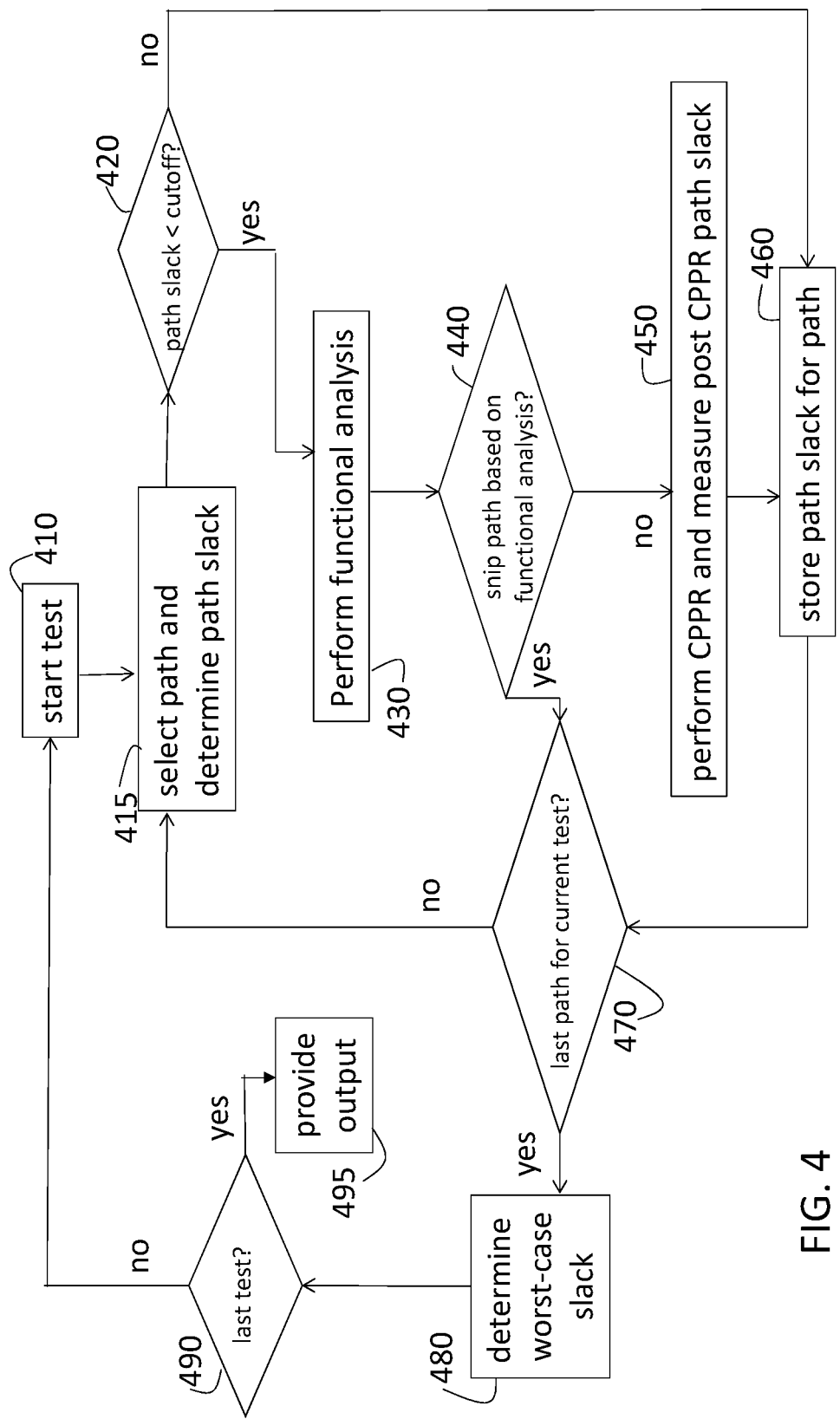
FIG. 4 is a process flow of method of integrating functional analysis with CPPR according to another embodiment.

FIG. 4 is a process flow of method of integrating functional analysis with CPPR according to another embodiment. Again, multiple tests and multiple paths may be considered, as discussed with reference to FIG. 3. The embodiment detailed with reference to FIG. 4 relates to eliminating unnecessary CPPR based on functional analysis results. At block 410, starting a test leads to selecting a path and determining path slack at block 415. Determining path slack, at block 415, is performed as discussed with reference to block 315 (FIG. 3) and as further detailed below with reference to FIG. 5. Checking whether path slack is less than a user-defined or previously processed cutoff, at block 420, may facilitate skipping both the functional analysis and the CPPR processing. This is because, unless the path slack is less than the cutoff (at block 420), the process of storing the path slack for the path, at block 460, is executed. If the path slack is less than the cutoff, the processes include performing functional analysis at block 430 and determining, at block 440, if the path may be snipped (i.e., the path is a non-inverting feedback ("don't care") path). If the path may be snipped, then the path is skipped (for purposes of post-CPPR analysis), and no slack is stored for the corresponding path at block 460. Instead, the processes proceed to block 470. If the path may not be snipped (at block 440), then performing CPPR and measuring post-CPPR path slack is done at block 450.

As discussed above, if the path slack is greater than or equal to the cutoff value (at block 420), then the path has passed, the original path slack is stored (block 460) and additional paths are processed as needed (block 470). If the path slack is less than the cutoff (at block 420, then the path slack is insufficient. In this case, if the path is to be snipped based on functional analysis (at block 440), then nothing is stored (at block 460). If, on the other hand, the path is not to be snipped based on functional analysis (at block 440), then the processes include performing CPPR and determining post-CPPR path slack, at block 450. The CPPR process is further discussed with reference to FIG. 6. At block 460, both the initially determined path slack (at 415) and post-CPPR path slack are stored, and additional paths are processed as needed (block 470). As the description above makes clear, CPPR (at block 450) is avoided for any path that is snipped (at block 440) based on the functional analysis performed at block 430. When the last path has been processed for a given test (as determined at block 470), the worst-case slack is determined at block 480 in a similar way to the determination at block 380 (FIG. 3). At block 490, it is determined if the last test has been processed. If so, output is provided at block 495. If the last test has not been processed (block 490), then the processes discussed above are repeated for the next test (starting at block 410).

In alternate embodiments, performing CPPR (at block 450) may include the determination of various path-based credits such a statistical credit, coupling credit, or common path credit, for example. According to the embodiments discussed above, functional analysis may be performed before or after any of these types of path credit calculations. The embodiments detailed in FIGS. 3 and 4 may also be performed selectively based on performance considerations. For example, functional analysis may be performed before the calculation of a particularly expensive path credit (i.e., a path credit whose calculation requires relatively more resources than other CPPR processes.

Figure 5:
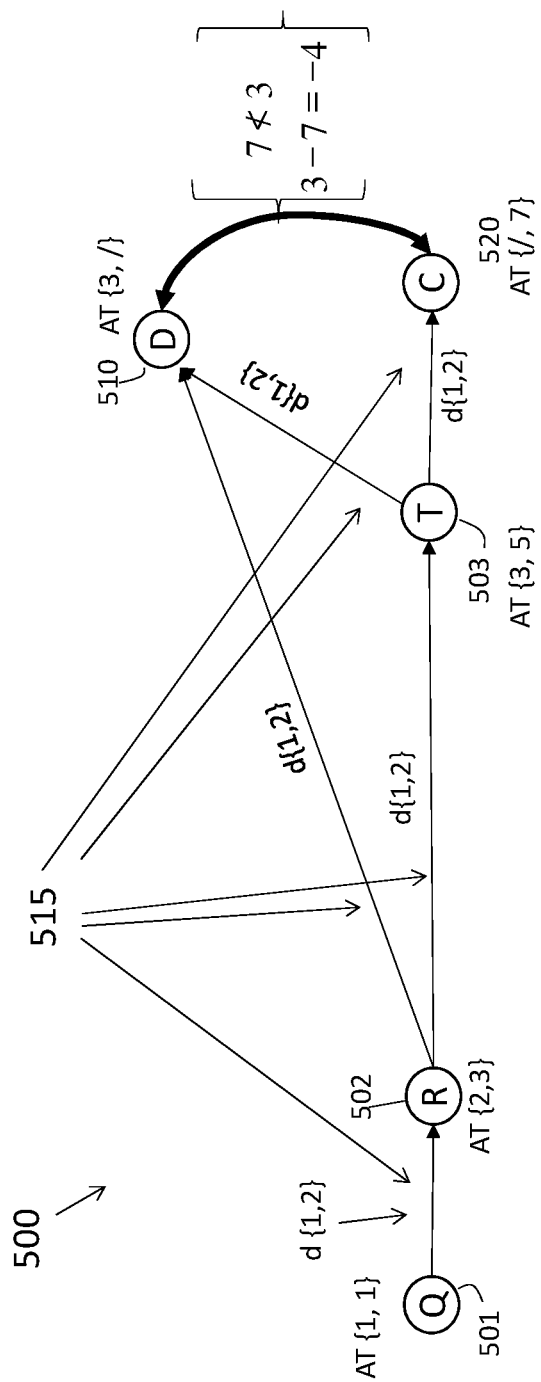
FIG. 5 illustrates an exemplary hold test that may be performed according to embodiments.

FIG. 5 illustrates an exemplary hold test that may be performed according to embodiments. The hold test is illustrated using an exemplary thread specific graphical representation (TSGR) 500 representing a computational thread within the overall directed acyclic graph modeling a chip of interest. However, the embodiments discussed with reference to FIGS. 3 and 4 are not limited to using a TSGR. Further, the embodiments are not limited to one particular type of test. This discussion pertains to the processes 315 (FIG. 3) and 415 (FIG. 4) and may be referred to as the determination of initial path slack using initial arrival times before any CPPR process is undertaken. FIG. 5 shows a source node Q 501, data node D 510, clock node C 520, and other nodes R 502 and T 503 along the path from the source node Q 501 to the data node D 510 or clock node C 520. The nodes (e.g., R 502, T 503) may be inverters, flip-flops, or other components. The interconnections among the nodes are referred to as edges 505 and, for explanatory purposes, are assumed to each have a delay (d) of {1,2} associated with them, where 1 and 2 are the early mode and late mode values, as noted above. The source node Q 501 has an arrival time (AT) of {1,1} (early and late mode arrival times are 1). This arrival time is propagated forward to determine the arrival times at all the other nodes of the TSGR 500. Thus, the arrival time at node R 502 is {2,3} (arrival time at Q 501 {1,1}+delay through the edge 505 between Q 501 and R 502 {1,2}).

As FIG. 5 shows, the edge 505 between Q 501 and R 502 and the edge 505 between R 502 and T 503 are both common to at least one path to the data node D 510 (Q 501→R 502→D 510 and Q 501→R 502→T 503→D 510) as well as to the clock node C 520 (Q 501→R 502→T 503→C 520). Thus, the edges 515 between Q 510 and R 502 and between R 502 and T 503 are subject to CPP, because the early mode delay through those edges 515 is propagated to determine the arrival time at the data node D 510 while the late mode delay through those same edges 515 is propagated to determine the arrival time at the clock node C 520. Because of the two paths to the data node D 510, the data node D 510 has two arrival times associated with it. However, for purposes of the hold test, the earlier among the early mode arrival times at the data node D 510 is of interest. The late mode arrival time is denoted with "/" to indicate that the value is not necessary for the exemplary hold test. In a similar manner, the early mode arrival time at the clock node C 520 is denoted with "/" because only the late mode arrival time at the clock node C 520 is of interest with respect to the exemplary hold test. As FIG. 5 indicates, the path slack is the difference between the early mode arrival time at the data node D 510 and the late mode arrival time at the clock node C 520, which is −4 (3-7).

Figure 6:
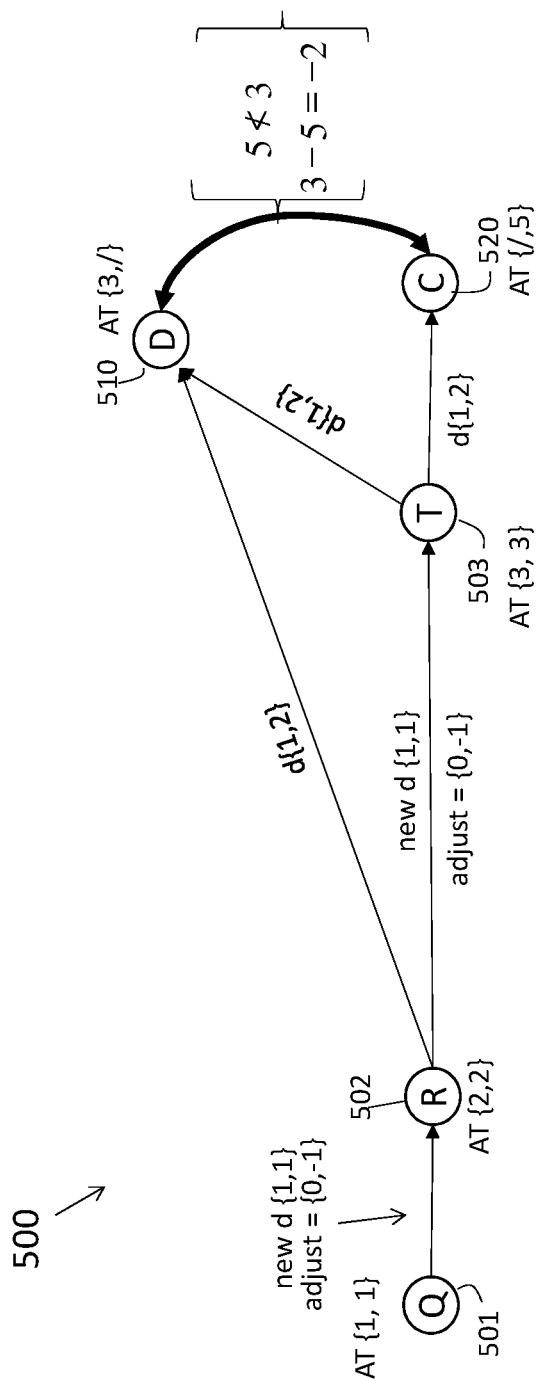
FIG. 6 illustrates determination of post-common path pessimism removal (CPPR) path slack according to embodiments.

FIG. 6 illustrates determination of post-common path pessimism removal (CPPR) path slack according to embodiments. This discussion pertains to the processes 330 (FIG. 3) and 450 (FIG. 4). The exemplary TSGR 500 is shown again. As discussed with reference to FIG. 5 above, the edges between nodes Q 510 and R 503 and between R 502 and T 503 are subject to CPP. FIG. 6 shows the result of CPPR on those edges 515 in the form of adjust={0,−1}. That is, the late mode delay through the common edges 515 is reduced by 1. As such, the new delay (d) is {1,1}, as shown. The arrival time of {1,1} at the source node Q 501 is propagated forward again using the new delay through the edges 515 between nodes Q 501 and R 502 and R 502 and T 503. The resulting early mode arrival time at the data node D 510 (3) and late mode arrival time at the clock node C 520 (5) are shown. The post-CPPR path slack is −2 (3−5).

According to embodiments discussed herein, as individual paths are analyzed (e.g., path Q 501→R 502→D 510), any such paths whose adjusted path slack is still below a specified cutoff value may then be processed according to the exemplary embodiments shown in FIGS. 3 and 4. According to the embodiment shown in FIG. 3, functional analysis is performed and the post-CPPR values may be disregarded if said the functional analysis indicates that the path may be snipped (e.g, is a "don't care" path that cannot functionally cause a transition to occur at the test). According to the embodiment shown in FIG. 3, prior to running CPPR analysis (i.e., before the exemplary process discussed with reference to FIG. 6 is reached), functional analysis is first performed, and the path in question is disregarded if the functional analysis indicates the path may be snipped.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of integrating a functional analysis and common path pessimism removal (CPPR) in static timing analysis, the method comprising:
   determining, using a processor, initial path slack for a path for a given timing analysis test;
   comparing, using the processor, the initial path slack with a threshold value to determine if the path passes or fails the given timing analysis test;
   based on the path failing the given timing analysis test, performing the CPPR on the path only based on a result of performing the functional analysis on the path, wherein the performing the functional analysis on the path includes identifying the path as a path to be snipped based on the path being a non-inverting feedback path; and
   obtaining a physical implementation of an integrated circuit according to the static timing analysis.

2. The computer-implemented method according to claim 1, wherein the determining the initial path slack includes propagating an initial arrival time of a source node of the path to other nodes of the path using a delay associated with each edge interconnecting the source node to one of the other nodes or the other nodes to each other.

3. The computer-implemented method according to claim 2, wherein the determining the initial path slack is based on comparing an initial arrival time of a data node among the other nodes with an initial arrival time of a clock node among the other nodes.

4. The computer-implemented method according to claim 3, wherein the determining the initial path slack is based on comparing an early mode of the initial arrival time of the data node with a late mode of the initial arrival time of the clock node based on the given timing analysis test being a hold test.

5. The computer-implemented method according to claim 1, further comprising obtaining the threshold value from a user.

6. The computer-implemented method according to claim 1, wherein the performing the functional analysis on the path is not done based on the path passing the given timing analysis test.

7. The computer-implemented method according to claim 1, wherein the performing the CPPR on the path is not done based on the identifying the path as the path to be snipped.

8. A system to integrate a functional analysis and common path pessimism removal (CPPR) in static timing analysis, the system comprising:
   a memory device configured to store a threshold value; and
   a processor configured to determine an initial path slack for a path for a given timing analysis test, compare the initial path slack with the threshold value to determine if the path passes or fails the given timing analysis test, and, based on the path failing the given timing analysis test, perform the CPPR on the path only based on a result of performing the functional analysis on the path, wherein, based on the processor performing the functional analysis on the path, the processor identifies the path as a path to be snipped based on the path being a non-inverting feedback path, wherein the system includes a physical implantation of an integrated circuit resulting from the static timing analysis.

9. The system according to claim 8, wherein the processor determines the initial path slack by propagating an initial arrival time of a source node of the path to other nodes of the path using a delay associated with each edge interconnecting the source node to one of the other nodes or the other nodes to each other, and comparing an initial arrival time of a data node among the other nodes with an initial arrival time of a clock node among the other nodes.

10. The system according to claim 9, wherein the processor determines the initial path slack by comparing an early mode of the initial arrival time of the data node with a late mode of the initial arrival time of the clock node based on the given timing analysis test being a hold test.

11. The system according to claim 8, wherein the threshold value is provided by a user.

12. The system according to claim 8, wherein the processor does not perform the CPPR on the path based on identifying the path as the path to be snipped.

13. A computer program product for integrating a functional analysis and common path pessimism removal (CPPR) in static timing analysis, the computer program product comprising a computer readable storage medium having program instructions embodied therewith, the program instructions executable by a processor to perform a method comprising:
   determining initial path slack for a path for a given timing analysis test;
   comparing the initial path slack with a threshold value to determine if the path passes or fails the given timing analysis test; and based on the path failing the given timing analysis test, performing the CPPR on the path only based on a result of performing the functional analysis on the path, wherein the performing the functional analysis on the path includes identifying the path as a path to be snipped based on the path being a non-inverting feedback path, wherein a physical implementation of an integrated circuit is obtained from the static timing analysis.

14. The computer program product according to claim 13, wherein the determining the initial path slack includes propagating an initial arrival time of a source node of the path to other nodes of the path using a delay associated with each edge interconnecting the source node to one of the other nodes or the other nodes to each other and comparing an initial arrival time of a data node among the other nodes with an initial arrival time of a clock node among the other nodes.

15. The computer program product according to claim 14, wherein the determining the initial path slack is based on comparing an early mode of the initial arrival time of the data node with a late mode of the initial arrival time of the clock node based on the given timing analysis test being a hold test.

16. The computer program product according to claim 13, wherein the performing the functional analysis on the path is not done based on the path passing the given timing analysis test.

17. The computer program product according to claim 13, wherein the performing the CPPR on the path is not done based on the identifying the path as the path to be snipped.

* * * * *